United States Patent
Doo et al.

(10) Patent No.: US 7,300,214 B2
(45) Date of Patent: Nov. 27, 2007

(54) OPTICAL MODULE INTERFACING DEVICE AND ETHERNET SYSTEM USING THE SAME

(75) Inventors: Kyeong Hwan Doo, Daejeon (KR); Bin Yeong Yoon, Daejeon (KR); Dong Yong Kwak, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 661 days.

(21) Appl. No.: 10/828,423

(22) Filed: Apr. 19, 2004

(65) Prior Publication Data

US 2004/0197104 A1 Oct. 7, 2004

(30) Foreign Application Priority Data

Oct. 9, 2003 (JP) .................... 10-2003-0070119

(51) Int. Cl.
*G02B 6/36* (2006.01)
*G02B 6/32* (2006.01)
*H01R 12/14* (2006.01)
*H01R 13/66* (2006.01)

(52) U.S. Cl. ................ 385/92; 385/89; 439/55; 439/620.23

(58) Field of Classification Search .......... None
See application file for complete search history.

(56) References Cited

U.S. PATENT DOCUMENTS

| | | | |
|---|---|---|---|
| 6,179,627 B1 | 1/2001 | Daly et al. | |
| 6,533,470 B2 * | 3/2003 | Ahrens | 385/88 |
| 6,705,879 B2 * | 3/2004 | Engel et al. | 439/76.1 |
| 6,731,510 B1 * | 5/2004 | Hwang et al. | 361/754 |
| 6,876,838 B1 * | 4/2005 | Daly et al. | 455/90.3 |

* cited by examiner

*Primary Examiner*—Rodney Bovernick
*Assistant Examiner*—Omar Rojas
(74) *Attorney, Agent, or Firm*—Blakely, Sokoloff, Taylor & Zafman (57) ABSTRACT

Disclosed are an optical module interfacing device for connecting an RJ interface and an SFP type optical module to an SFP type optical module connector without additional processing, and an Ethernet system using the optical module interfacing device, thus supporting data transmission and reception. The optical module interfacing device includes a board having the same dimensions as those of the optical module, a male connector, having the same dimensions as those of the optical module, formed at a side surface of one end of the board to be connected to the female connector for the optical module mounted on a host board, and an RJ female connector provided with a plurality of pins formed on an upper surface of the board, respectively corresponding to pins of the male connector, according to standards. Further, UTP data is provided to MDI supporting ports of a physical layer through an interfacing unit.

3 Claims, 6 Drawing Sheets

OPTICAL MODULE INTERFACING DEVICE AND ETHERNET SYSTEM USING THE SAME

BACKGROUND OF THE INVENTION

1. Field of the Invention

The present invention relates to an optical module interfacing device for connecting an UTP cable connector and an SFP type optical module to an SFP type optical module connector installed on a host board without additionally processing the UTP cable connector and the SFP type optical module, and an Ethernet system using the optical module interfacing device.

2. Description of the Related Art

As the Internet has rapidly come into wide use, Ethernet-based Internet networks require higher-speed and mass-storage capabilities, thus increasing capacity and the number of ports in an interfacing device of a system.

For example, in case that a single interfacing device processes traffic of 10 Gigabit capacity, the interfacing device requires at least ten Gigabit Ethernet ports.

According to definitions of IEEE 802.3z (1000 Base-X) and IEEE 802.3ab (1000 Base-T) standards, Gigabit Ethernet supports both an optical cable and a category 5 UTP cable. An interfacing device employing such Gigabit Ethernet ports selectively comprises an optical module based on the IEEE 802.3z standard or an RJ-45 port based on the IEEE 802.3ab standard.

Figure 1:
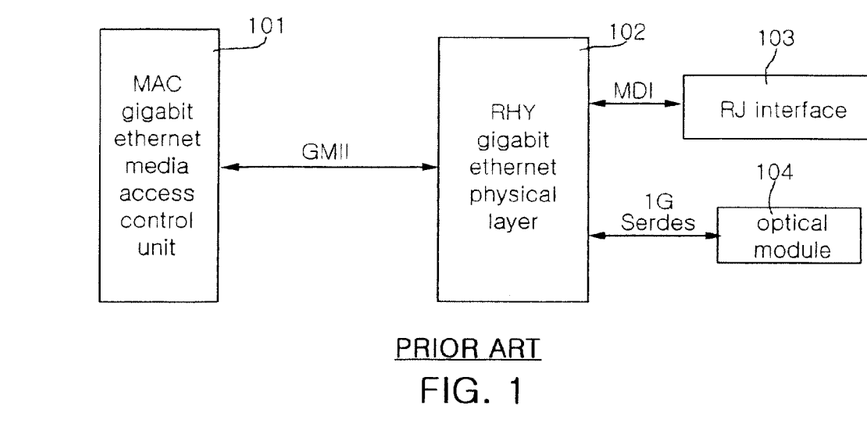
FIG. 1 is a block diagram illustrating a connection structure between a transmission medium and a conventional Ethernet system.

A lower hierarchical structure of such a Gigabit Ethernet system will be described with reference to FIG. 1. As shown in FIG. 1, a register jack interface unit (hereinafter, referred to as an "RJ interface") 103 or an optical module unit 104 is connected to a physical layer 102. Herein, the physical layer 102 is a Gigabit transceiver, which independently receives the RJ interface 103 and the optical module unit 104 so that users select the RJ interface 103 or the optical module unit 104 as occasion demands. The RJ interface 103 is a single line jack, such as an RJ-45 interface for digital transmission through a telephone cable (for example, a category 5 Unshielded Twisted Pair (hereinafter, referred to as a "UTP") cable), and the optical module unit 104 is a means for converting an optical signal into an electric signal or an electric signal into an optical signal for digital transmission through an optical cable.

Here, a GMII (Gigabit Media Independent Interface) for connecting a media access control unit 101 and the physical layer 102 is an extended type of an MII (Media Independent Interface), and is a standard interface for supporting conventional 10 Mbps, 100 Mbps and 1,000 Mbps half-duplex and full-duplex communication systems.

Figure 2A:
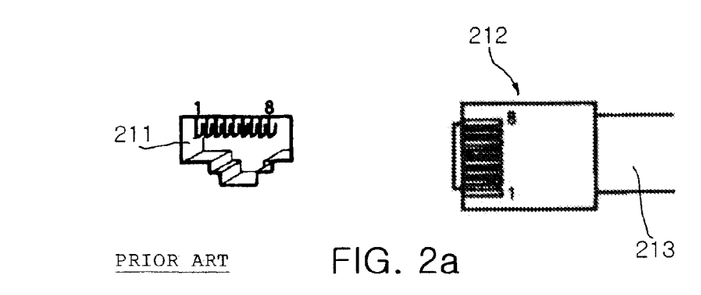
FIG. 2a is a perspective view illustrating a structure of a conventional RJ-45 interface.

The above RJ interface 103 serves as a connector installed on a LAN card of a conventional PC, and as shown in FIG. 2a, includes a female connector 211 installed on a host board 204 and a male connector 212 provided at an end of an UTP cable 213. 8 pins are formed at a corresponding position of each of the female connector 211 and the male connector 212.

The optical module 104 is the means for converting an optical signal into an electric signal or an electric signal into an optical signal, and is one selected from the group consisting of an SFF (Small Form Factor) type, an SFP (Small Form factor Pluggable) type, a GBIC (Gigabit Interface Conversion) type and a 1×9 transceiver type, according to shapes of packages employing the optical module 104. Since an SFF or SFP type optical module has a size half of that of a GBIC or 1×9 transceiver type optical module, the SFF or SFP type optical module is suitable for a system provided with several tens of optical modules.

Figure 2B:
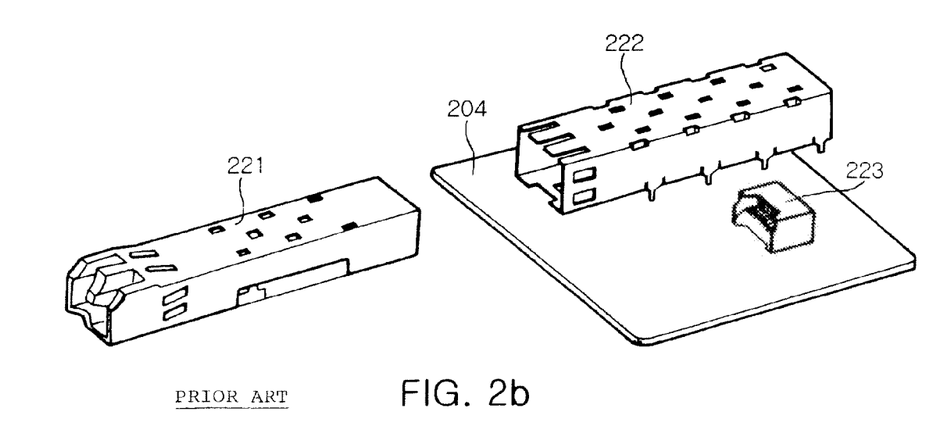
FIG. 2b is a perspective view illustrating a structure of a conventional optical module interfacing device.

Particularly, an SFP type optical module is a kind of a GBIC type optical module. As shown in FIG. 2b, the SFP type optical module 221 is designed such that an SFP connector 223 is installed at a designated position of a board 224, and a guide and an EMI shielding case 222 are covered on the SFP connector 223 so that the SFP optical module 221 is inserted into the EMI shielding case 222 and connected to the SFP connector 223. The SFP type optical module 221 is detachably mounted on the board 224, if necessary, thus being frequently and conveniently used. Here, the SFP type optical module 221 meets the requirements of the case 222, an electrical connector, the lay-out of the board 224 and an electrical interface based on MSA (Multi Source Agreement).

As described above, in case that an Ethernet system of 10 Gigabit or more receives both an optical cable and an UTP cable, each physical layer must independently include an optical module and an RJ interface, thus increasing the number of connectors provided on a host board and causing a limit in space on the host board.

Accordingly, in case that an interfacing device for receiving 10 Gigabit traffic is achieved in the Ethernet system and a user has the right of selection, the interfacing device requires at least 10 connectors for respectively connecting the optical modules and the RJ interfaces. Further, since one port corresponds to one of the optical module and the RJ interface, the number of ports substantially used is half of the total number of the ports, thus causing waste in cost and space. Moreover, in case that a cable is simultaneously inserted into the optical module and the RJ interface, there occurs confusion in selection between the optical module and the RJ interface.

SUMMARY OF THE INVENTION

Therefore, the present invention has been made in view of the above problems, and it is an object of the present invention to provide an optical module interfacing device for supporting data transmission and reception, which connects an RJ interface and an SFP type optical module to an SFP optical module connector installed on a host board without additionally processing the RJ interface and the SFP type optical module, and an Ethernet system using the optical module interfacing device.

In accordance with one aspect of the present invention, the above and other objects can be accomplished by the provision of an optical module interfacing device, connected to a female connector for an SFP type module for providing data transmission/reception functions through an UTP cable, comprising: a board having the same dimensions as those of the optical module; a male connector, having the same dimensions as those of the optical module, formed at a side surface of one end of the board and connected to the female connector for the optical module mounted on a host board; and an RJ female connector provided with a plurality of pins formed on an upper surface of the board, respectively corresponding to pins of the male connector, according to standards.

Preferably, the board and the male connector may have the same dimensions as those of the SFP type optical module.

Further, preferably, the RJ female connector may be a female connector having a standard of RJ-45.

Moreover, preferably, optical module pins MOD-DEF0, MOD-DEF1, MOD-DEF2, TX fault, Rate Select and three ground pins out of pins of the male connector may be connected to pins of the RJ female connector, and optical module interfacing device may further comprise an interfacing circuit for converting power of the male connector into power of the RJ female connector through a regulator and for supplying the power converted by the regulator to connection lines between the optical module pins MOD-DEF0, MOD-DEF1, MOD-DEF2, TX fault, Rate Select and three ground pins of the male connector, and the pins of the RJ female connector, through resistors of designated impedance.

In accordance with another aspect of the present invention, there is provided an Ethernet system for simultaneously supporting data communication through optical and UTP cables, comprising: a host board; a physical layer, mounted on the host board, for supporting data communication through the optical and UTP cables; an optical module, provided at an end of the optical cable, for converting an optical signal to an electric signal or an electric signal to an optical signal; optical module interfacing means, provided at an end of the UTP cable and having the same dimensions as those of the optical module, for supporting an RJ interface; and an interfacing unit, mounted on the host board and including a female connector having the same dimensions as those of the optical module, for connecting the optical module to optical data communication supporting ports of the physical layer when the optical module is inserted into the female connector and for connecting the optical module interfacing means to UTP data communication supporting ports of the physical layer when the optical module interfacing means is inserted into the female connector, wherein one of the optical module and the optical module interfacing means is detachably mounted on the interfacing unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 3:
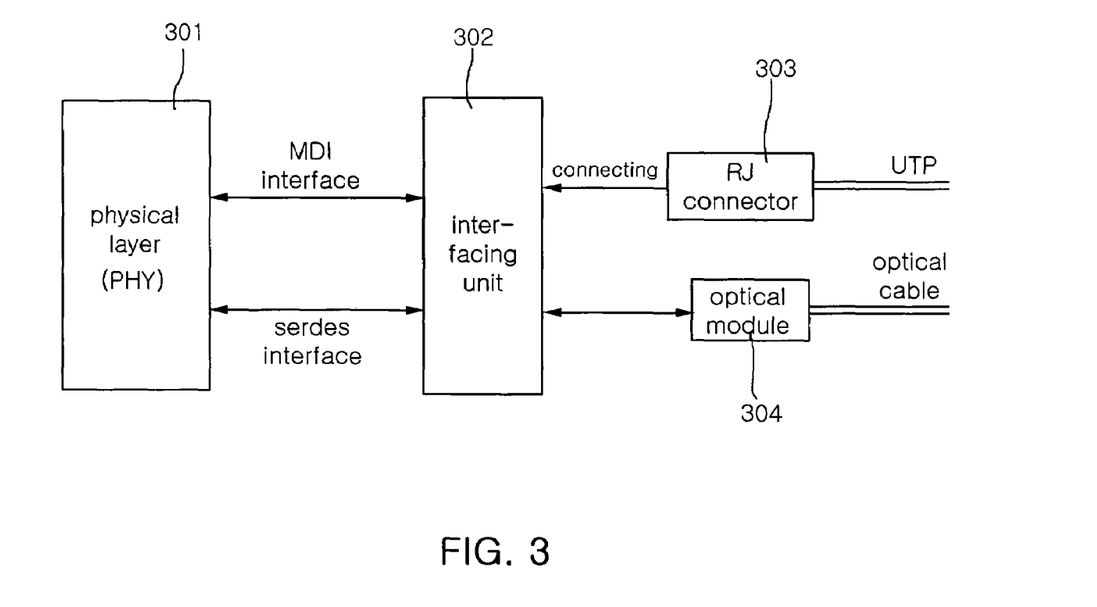
FIG. 3 is a block diagram illustrating a connection structure between a transmission medium and an Ethernet system using an interfacing device in accordance with the present invention.

FIG. 3 is a block diagram illustrating a connection structure between a transmission medium and an Ethernet system using an RJ interfacing device in accordance with the present invention. The Ethernet system serves to transmit and receive data through a physical medium, and comprises a physical layer 301 for supporting data transmission through both an optical cable and an UTP cable, an interfacing unit 302 provided with a female connector, for an optical module, which is connected simultaneously to optical cable data transmission ports and UTP cable data transmission ports of the physical layer 301 for connecting the optical cable or the UTP cable to the physical layer 301, an RJ optical module interfacing device 303 provided at an end of the UTP cable and electrically and detachably mounted on the interfacing unit 302, and an optical module 304 provided at an end of the optical cable and detachably mounted on the interfacing unit 302 for converting an optical signal into an electrical signal or an electrical signal into an optical signal.

For example, the physical layer 301 is a Gigabit Ethernet transceiver. The physical layer 301 supports data transmission and reception functions through the optical cable and the UTP cable based on definitions of IEEE.802.3z and IEEE.802.3ab standards, and is provided with optical cable data transmission/reception and control ports and UTP cable data transmission/reception and control ports.

The interfacing unit 302 is an intermediate means for connecting the RJ optical module interfacing device 303, connected to an RJ connector provided at the end of the UTP cable, or the optical module 301 to the physical layer 304, and includes an optical module connector installed on a host board of the Ethernet system, and a circuit unit for connecting the optical module connector and the physical layer 301. Hereinafter, the physical layer 301 will be described in detail.

Figure 4:
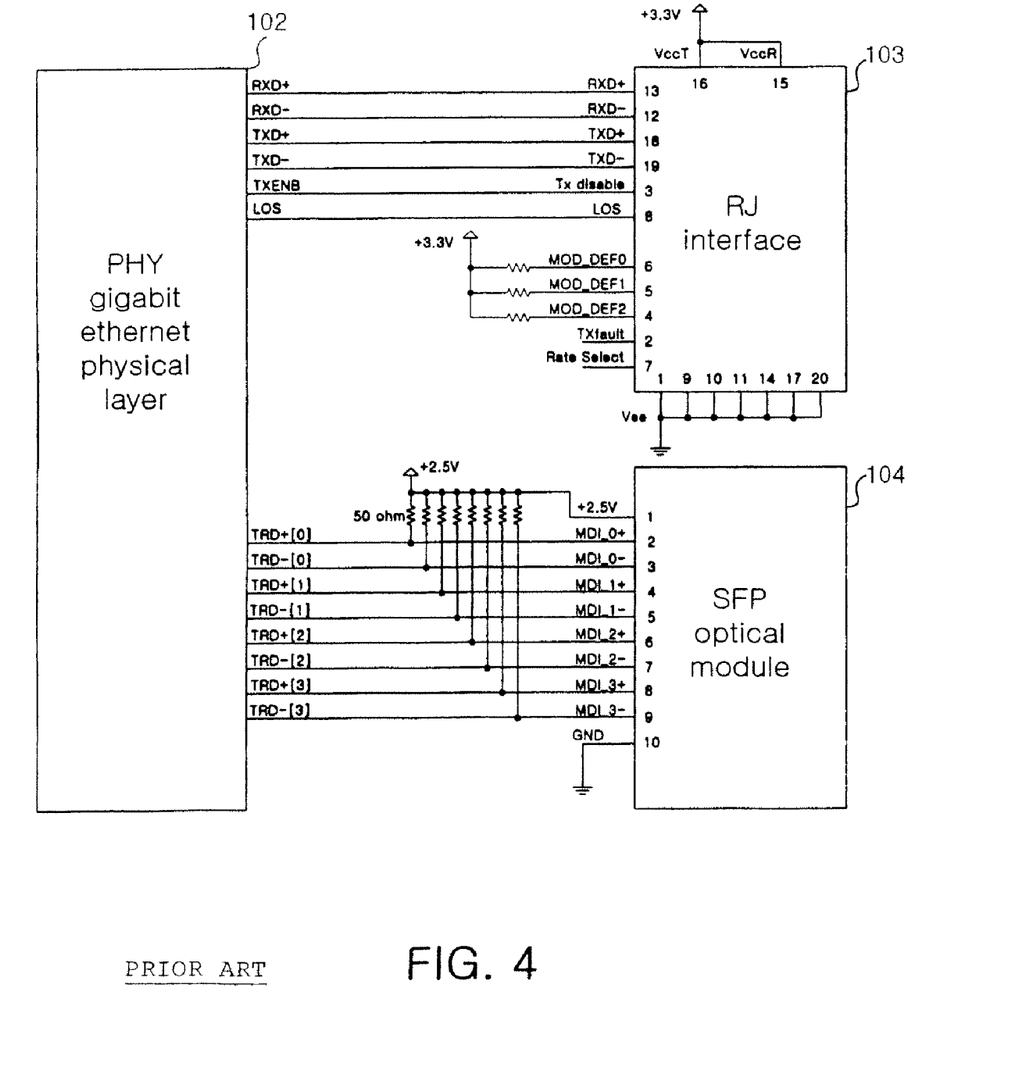
FIG. 4 is a detailed circuit diagram illustrating a connection structure between a transmission medium interface and a physical layer of a conventional Ethernet system.

As shown in FIG. 4, the conventional physical layer 102 includes a plurality of data transmission/reception ports according to definitions of IEEE.802.3z and IEEE.802.3ab standards. Optical cable data transmission/reception and control ports (RXD+, RXD−, TXD+, TXD−, TXENB, LOS) of the physical layer 102 are connected to corresponding ports (RXD+, RXD−, TXD+, TXD−, Tx disable, LOS) of the conventional optical module 104 by Serdes (Serializer and Deserializer) interfaces, and UTP cable data transmission/reception and control ports (TRD+[0:3], TRD−[0:3]) of the physical layer 102 are connected to corresponding ports (MDI_0+/−~MDI_3+/−) of the RJ interface 103 by MDIs (Media Dependent Interfaces). Here, pin-assigned signals supplied to the RJ interface 103 and the optical module unit 104 are based on the definitions of the above standards, thus being incapable of rearrangement. The physical layer 102 is provided with additional pins for selecting desired interfaces among the Serdes interfaces and the MDIs, and randomly sets '0' or '1' to the Serdes interfaces and the MDIs.

TRD+[3:0] and TRD−[3:0] defined for the MDI interfaces are four couples of differential signals transmitted and received through an RJ-45 connector in a 1000BASE-T mode, whereas TRD±[2:3] is not used, TRD±[0] serves as a transmitting signal and TRD±[1] serves as a receiving signal in 10BASE-T, 100BASE-T and auto-negotiation modes. In case that the Serdes interfaces are selected, the MDIs are not used.

Table 1 shows pin information of the SFP type optical module connector.

TABLE 1

| Pin number | Name | I/O | Function |
|---|---|---|---|
| 1 | VeeT | I | TX Ground |
| 2 | TX Fault | O | Tx Fault Indication |
| 3 | TX Disable | I | Transmitter Disable |
| 4 | MOD-DEF2 | O | Wire serial ID interface |
| 5 | MOD-DEF1 | O | Wire serial ID interface |
| 6 | MOD-DEF0 | O | Connect to Ground in Optical module |
| 7 | Rate Select | I | Select between full or reduced receiver bandwidth |
| 8 | LOS | O | Loss of Signal |
| 9 | VeeR | I | Receiver Ground |
| 10 | VeeR | I | Receiver Ground |
| 11 | VeeR | I | Receiver Ground |
| 12 | RD− | O | Inverse Received Data out |
| 13 | RD+ | O | Received Data out |
| 14 | VeeR | I | Receiver Ground |
| 15 | VccR | I | Receiver Power |
| 16 | VccT | I | Transmitter Power |
| 17 | VeeT | I | Transmitter Ground |
| 18 | TD+ | I | Transmit Data In |
| 19 | TD− | I | Inverse Transmit Data In |
| 20 | VeeT | I | Transmitter Ground |

In Table 1, O of I/O denotes output from the SFP connector to the physical layer 102, and I of I/O denotes input from the host board or the physical layer 102 to the SFP connector.

In the present invention, the physical layer 301 is connected to the interfacing unit 302, and the interfacing unit 302 is connected to the optical module 304 provided at the end of the optical cable or the optical module interfacing device 303, into which the RJ connecter provided at the end of the UTP cable is inserted, so that the connection end of the optical module 304 or the optical module interfacing device 303 is connected to the corresponding ports of the physical layer 301. For example, in case that the physical layer 301 supports the Serdes interfaces required to be connected to the optical module 304 and the MDIs required to be connected to the RJ-45 male connector, the interfacing unit 302 includes an optical connector (for example, an SFP connector), and the physical layer 301 is connected to the SFP connector simultaneously through the Serdes interfaces and the MDIs using unusable pins of the SFP connector.

Figure 5:
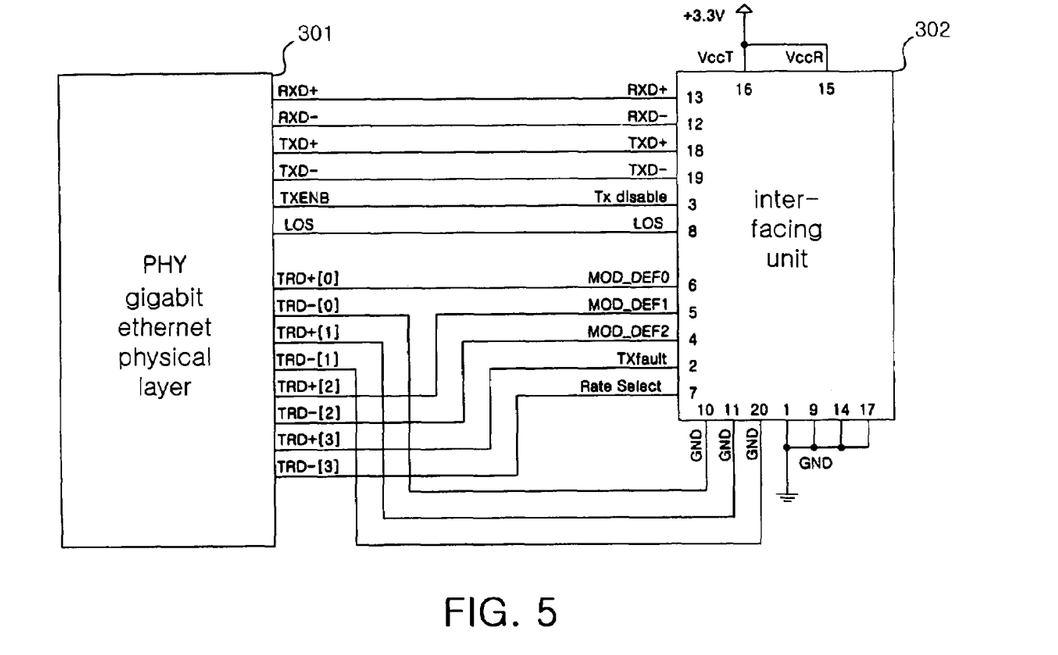
FIG. 5 is a detailed circuit diagram illustrating a connection structure between a transmission medium and a physical layer of an Ethernet system in accordance with the present invention.

FIG. 5 is a detailed circuit diagram illustrating a connection structure between the interfacing unit 302 and the physical layer 301 of the Ethernet system in accordance with the present invention. Here, the physical layer 301 has the same constitution and function as those of the conventional physical layer 102 shown in FIG. 1. The interfacing unit 302 includes an SFP optical module connector.

As described above, the physical layer 301 includes a plurality of data transmission/reception ports according to definitions of IEEE.802.3z and IEEE.802.3ab standards. Optical cable data transmission/reception and control ports (RXD+, RXD−, TXD+, TXD−, TXENB, LOS) of the physical layer 301 are respectively connected to corresponding ports (RXD+, RXD−, TXD+, TXD−, Tx disable, LOS) of the SFP optical module connector of the interfacing unit 302, and UTP cable data transmission/reception and control ports (TRD+[0:3], TRD−[0:3]) of the physical layer 301 are respectively connected to residual ports (MOD_DEF0~MOD_DEF2, TXfault, Rate Select, GND 10, 11, 20) of the SFP optical module connector of the interfacing unit 302.

The main object of the connection between the physical layer 301 and the interfacing unit 302 is the connection between the Serdes interfaces and the MDI interfaces without interference. In FIG. 5, the positions of pins between the MDI interfaces at the side of the interfacing unit 302 can be varied in the above range in which the interference between the Serdes interfaces and the MDI interfaces is not generated. Here, the Serdes interfaces are based on the conventional standard. MOD-DEF0, MOD-DEF1, MOD-DEF2 and Tx fault pins, among the pins of the EFP type connector shown in Table 1, correspond to output signals representing information and state of the SFP optical module, and are not required by the use of the Serdes interfaces. Conventionally, as shown in FIG. 4, such pins are in a full-up or opened state. As shown in FIG. 5, the above pins are used for the MDI interfaces, and connected to the MDI interface ports of the physical layer 301. More particularly, the ports (TRD+[0], TRD+[2], TRD−[2], and TRD+[3]) of the physical layer 301 are respectively connected to the ports (MOD-DEF0, MOD-DEF1, MOD-DEF2, and TX Fault) of the interfacing unit 302. Generally, since the port (MOD-DEF 0) is connected to the ground of the optical module 304, when the optical module 304 is inserted into the interfacing unit 302, the port (TRD+[0]) of the physical layer 301 is automatically connected to the ground. The pin (Rate Select) of the SFP connector is an input pin of the optical module 304 but is not used, thus being in an opened or high state when the optical module 304 is connected to the SFP connector. In FIG. 5, the pin (Rate Select) of the interfacing unit 302 is connected to the pin (TRD−[3]) of the physical layer 301, thus being ignored when the MDI interfaces are not used. The pins (TRD−[0], TRD+[1], and TRD−[1]) of the physical layer 301 are respectively connected to the pin numbers 10, 11 and 20 of the SFP connector. In the optical module 304, such pins numbers 10, 11 and 20 are connected to the ground together with the pin numbers 1, 9, 14 and 17. Since such pins are connected to each other in the optical module 304, whereas the above pins are conventionally connected to the ground in the host board, although they are not connected to a separate ground, when the optical module 304 is inserted into the interfacing unit 302, the pin numbers 10, 11 and 20 have a ground level through the pins 1, 9, 14 and 17.

Accordingly, when the optical module 304 is inserted into the interfacing unit 302, the pin numbers 10, 11 and 20 in the interfacing unit 302 maintain the ground level and the pins (TRD−[0], TRD+[0], TRD−[1]) of the physical layer 301 are connected to the ground. On the other hand, when the RJ optical module interfacing device 303 is connected to the interfacing unit 302, the pin numbers 13, 12, 18, 19, 3 and 8 for the connection to the Serdes interfaces are in an opened state and disconnected from the physical layer 301 and the pin numbers 6, 5, 4, 2, 7, 10, 11 and 20 for the connection to the MDIs are connected to the physical layer 301 so as to achieve the data transmission/reception through the UTP cable.

In case that the interfacing unit 302 is connected to the physical layer 301 as shown in FIG. 5, the optical module 304 has the same conventional structure, but the RJ optical module interfacing unit 303 provided at the end of the UTP cable must be changed to have a shape similar to that of the optical module connector. That is, the RJ optical module interfacing unit 303 includes an RJ female connecter connected to the RJ male connector provided at the end of the UTP cable, a male connector connected to the interfacing unit 302, and an interface circuit for connecting the RJ connector and the male connector.

Figure 6:
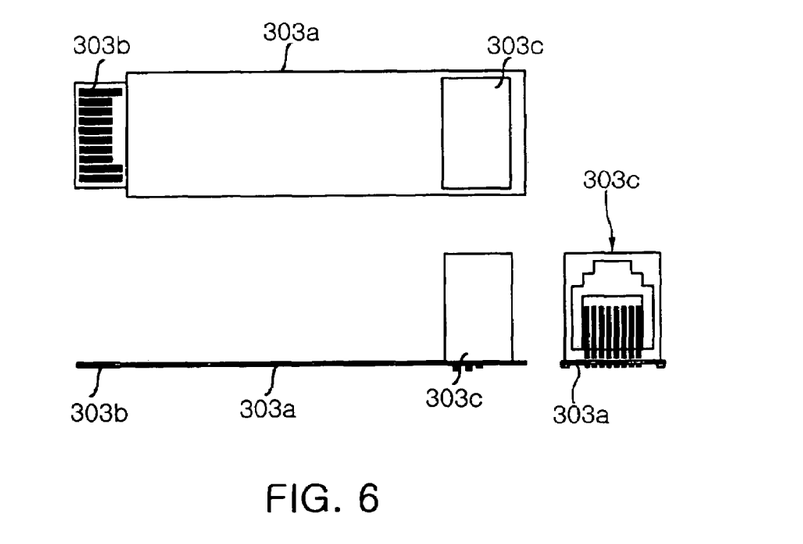
FIG. 6 is a schematic view of an RJ interfacing device, which is connectable to an optical module connecter, in accordance with the present invention.
Figure 7:
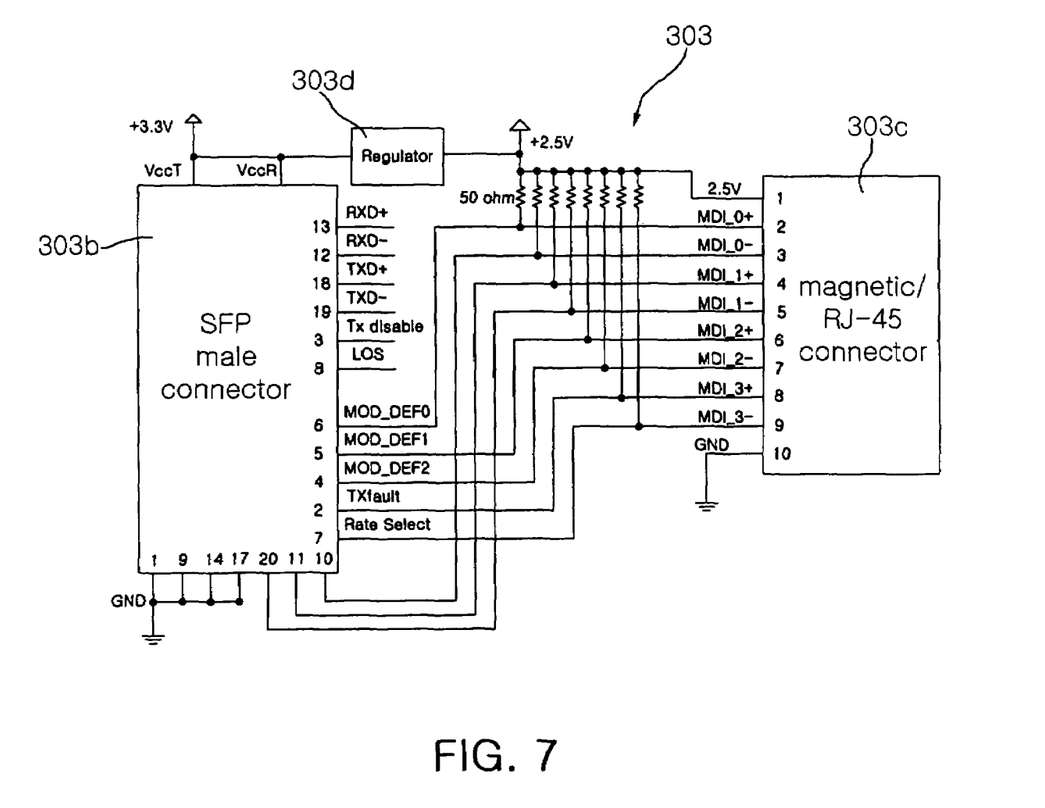
FIG. 7 is a detailed circuit diagram of the RJ interfacing device, which is connectable to the optical module connector, in accordance with the present invention.

FIGS. 6 and 7 are a schematic view and a detailed circuit diagram of the RJ optical module interfacing device 303, in which the optical module connecter has an SFP type, in accordance with the present invention.

With reference to FIG. 6, the RJ optical module interfacing device 303 includes an SFP type male connector 303b at a side surface of one end of a board 303a having a designated size (that is, having approximately the same size as that of the optical module), and an RJ female connector 303c at an upper surface of the other end of the board 303a. Pins for connection to the MDIs of the SFP male connector 303b and a conversion circuit for connection to pins of the RJ connector 303c are formed on the upper surface of the board 303a.

The conversion circuit formed on the board 303a is shown in FIG. 7.

As described above, the pin numbers 6, 5, 4, 2, 7, 10, 11, and 20 of the SFP type male connector 303b are connected to the pin numbers 2 to 9 of the RJ female connector 303c. Further, the conversion circuit includes a regulator 303d for receiving power (+3.3V) from the SFP male connector 303b and then converting the received power to power (2.5V) of the RJ female connector 303c, and a resistor circuit for connecting a signal line connecting the power (2.5V), outputted from the regulator 303d, to the SFP male connector 303b and the RJ female connector 303c.

Figure 8:
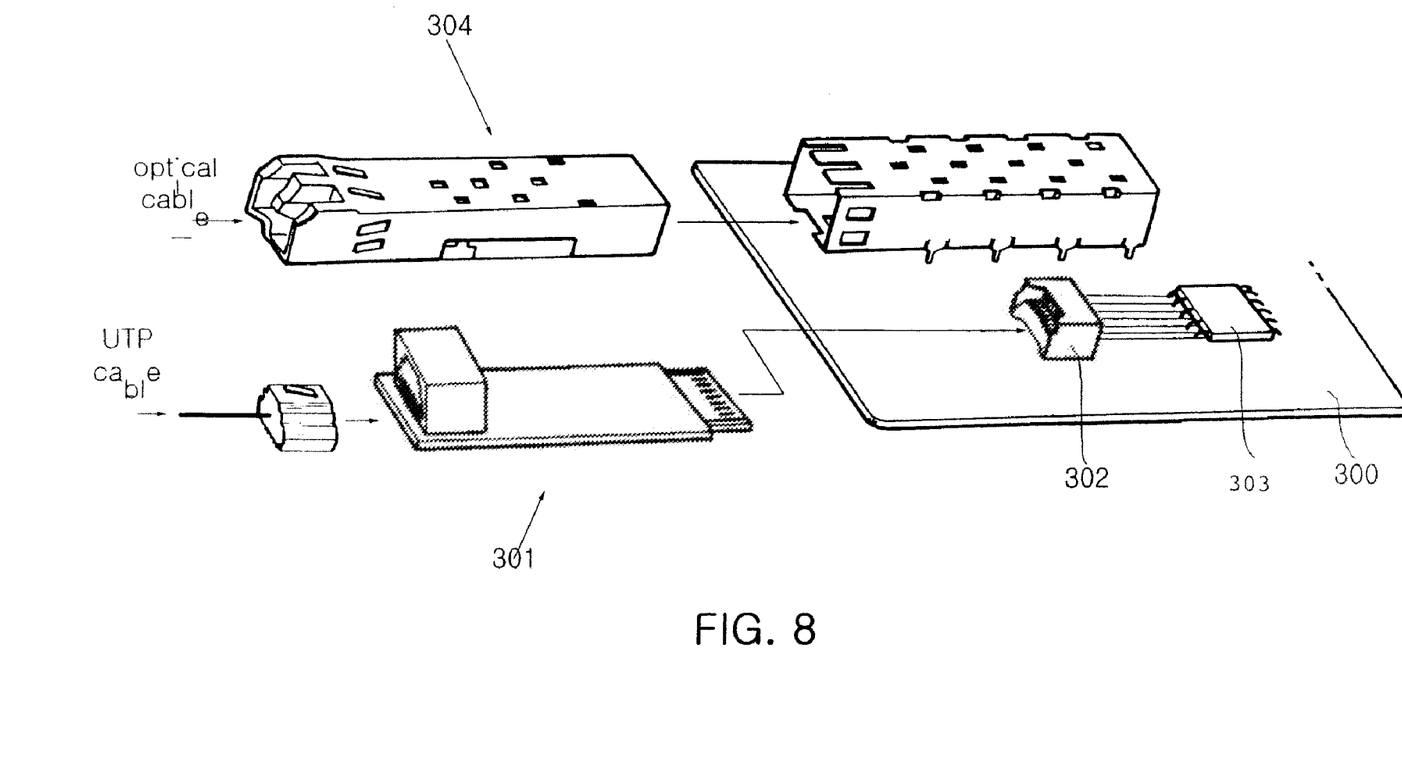
FIG. 8 is an exploded perspective view of the RJ interfacing device in a used state in accordance with the present invention.

FIG. 8 is an exploded perspective view of the RJ interfacing device 303 in a used state in accordance with one embodiment of the present invention. When the SFP female connector 302, connected to the MDIs and Serdes interfaces of the physical layer 301, is mounted on the host board 300, and a case is covered on the SFP female connector 302, the optical module 304 or the optical module interfacing device 303 are selectively inserted into the case according to user's selection. For example, the RJ connector provided at the end of the UTP cable is inserted into the optical module interfacing device 303, and is then connected to the SFP female connector 302 through the optical module interfacing device 303.

As apparent from the above description, the present invention provides an optical module interfacing device, in which an SFP type optical module or an RJ connector is selectively connected to one SFP type connector without additional processing, and an Ethernet system using the optical module interfacing device for simultaneously supporting an optical cable and an UTP cable, thus decreasing the number of required connectors on a host board by half and reducing the total size and cost of the Ethernet system, particularly a Gigabit Ethernet system. Further, since the optical module or the RJ connector is connected to one physical layer, it is possible to eliminate confusion generated when both the optical module and the RJ connector are simultaneously connected to the physical layer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical module interfacing device, connected to a female connector for an SFP type module for providing data transmission/reception functions through an UTP cable, comprising:
a board having the same dimensions as those of the optical module;
a male connector, having the same dimensions as those of the optical module, formed at a side surface of one end of the board and connected to the female connector for the optical module mounted on a host board; and
an RJ female connector provided with a plurality of pins formed on an upper surface of the board, respectively corresponding to pins of the male connector, according to standards, wherein the board and the male connector have the same dimensions as those of the SFP type optical module, and optical module pins MOD-DEF0, MOD-DEF1, MOD-DEF2, TX fault, Rate Select and three ground pins out of pins of the male connector are connected to pins of the RJ female connector,
further comprising an interfacing circuit for converting power of the male connector into power of the RJ female connector through a regulator and for supplying the power converted by the regulator to connection lines between the optical module pins MOD-DEF0, MOD-DEF1, MOD-DEF2, TX fault, Rate Select and three ground pins of the male connector, and the pins of the RJ female connector, through resistors of designated impedance.

2. The optical module interfacing device as set forth in claim 1,
wherein the RJ female connector is a female connector having a standard of RJ-45.

3. An Ethernet system for simultaneously supporting data communication through optical and UTP cables, comprising:
a host board;
a physical layer, mounted on the host board, for supporting data communication through the optical and UTP cables;
an optical module, provided at an end of the optical cable, for converting an optical signal to an electric signal or an electric signal to an optical signal;
optical module interfacing means, provided at an end of the UTP cable and having the same dimensions as those of the optical module, for supporting an RJ interface; and
an interfacing unit, mounted on the host board and including a female connector having the same dimensions as those of the optical module, for connecting the optical module to optical data communication supporting ports of the physical layer when the optical module is inserted into the female connector and for connecting the optical module interfacing means to UTP data communication supporting ports of the physical layer when the optical module interfacing means is inserted into the female connector,
wherein one of the optical module and the optical module interfacing means is detachably mounted on the interfacing unit, the optical module interfacing means includes:
a board having the same dimensions as those of the optical module;
a male connector, having the same dimensions as those of the optical module, formed at a side surface of one end of the board and connected to the female connector for the optical module mounted on the host board; and
an RJ female connector provided with a plurality of pins formed on an upper surface of the board, respectively corresponding to pins of the male connector, according to standards,
wherein the RJ female connector is connected to an RJ male connector provided at an end of the UTP cable, the board and the male connector have the same dimensions as those of an SFP type optical module, and optical module pins MOD-DEF0, MOD-DEF1, MOD-DEF2, TX fault, Rate Select and three ground pins out of pins of the male connector are connected to pins of the RJ female connector, further comprising an interfacing circuit for converting power of the male connector into power of the RJ female connector through a regulator and for supplying the power converted by the regulator to connection lines between the optical module pins MOD-DEF0, MOD-DEF1, MOD-DEF2, TX fault, Rate Select and three ground pins of the male connector, and the pins of the RJ female connector, through resistors of designated impedance.

* * * * *